(12) United States Patent
Stentiford

(10) Patent No.: US 7,653,238 B2
(45) Date of Patent: *Jan. 26, 2010

(54) IMAGE FILTERING BASED ON COMPARISON OF PIXEL GROUPS

(75) Inventor: Frederick W M Stentiford, Suffolk (GB)

(73) Assignee: British Telecommunications plc, London (GB)

( * ) Notice: Subject to any disclaimer, the term of this patent is extended or adjusted under 35 U.S.C. 154(b) by 547 days.

This patent is subject to a terminal disclaimer.

(21) Appl. No.: 10/581,027

(22) PCT Filed: Dec. 1, 2004

(86) PCT No.: PCT/GB2004/005049

§ 371 (c)(1),
(2), (4) Date: May 30, 2006

(87) PCT Pub. No.: WO2005/057490

PCT Pub. Date: Jun. 23, 2005

(65) Prior Publication Data

US 2007/0116354 A1 May 24, 2007

(30) Foreign Application Priority Data

Dec. 5, 2003 (GB) ................. 0328326.4

(51) Int. Cl.
*G06K 9/00* (2006.01)
(52) U.S. Cl. ...................................... 382/162
(58) Field of Classification Search ............... 382/162, 382/167, 170, 205, 218–222, 254, 260, 272, 382/274, 275; 358/1.9, 520
See application file for complete search history.

(56) References Cited

U.S. PATENT DOCUMENTS 4,646,352 A 2/1987 Asai et al.

(Continued)

FOREIGN PATENT DOCUMENTS

EP 0098152 1/1984

(Continued)

OTHER PUBLICATIONS

International Search Report dated Jun. 12, 2003.

(Continued)

*Primary Examiner*—Jose L Couso
(74) *Attorney, Agent, or Firm*—Nixon & Vanderhye PC

(57) ABSTRACT

Picture elements of a digitally coded image are each represented by a color value. The value of an element x is adjusted by firstly making a number of comparisons between elements elsewhere in the image. This comparison involves comparing a first picture element group (which may comprise the picture element x under consideration and at least one further picture element in the vicinity thereof) with a second picture element group. The second picture element group comprises a base picture element y and at least one further picture element, the number of picture elements in the second group being the same as the number of picture elements in the first group and the position of each further element of the second group relative to the base picture element of the second group being the same as the position of the respective further element of the first group relative to the picture element under consideration. The comparison determines whether the two groups match in the sense that they meet a criterion of similarity. When at least one comparison results in a match, a replacement color value for the picture element under consideration is generated, as a function of the color value for the base picture element of the second group for which a match was obtained.

21 Claims, 8 Drawing Sheets

U.S. PATENT DOCUMENTS

| | | | |
|---|---|---|---|
| 5,113,454 | A | 5/1992 | Marcantonio et al. |
| 5,200,820 | A * | 4/1993 | Gharavi .................. 375/240.12 |
| 5,303,885 | A | 4/1994 | Wade |
| 5,790,413 | A | 8/1998 | Bartusiak et al. |
| 5,825,016 | A | 10/1998 | Nagahata et al. |
| 5,850,471 | A * | 12/1998 | Brett ........................... 382/162 |
| 5,867,813 | A | 2/1999 | Di Pietro et al. |
| 5,978,027 | A | 11/1999 | Takeda |
| 6,094,507 | A | 7/2000 | Monden |
| 6,111,984 | A | 8/2000 | Fukasawa |
| 6,240,208 | B1 | 5/2001 | Garakani et al. |
| 6,266,676 | B1 | 7/2001 | Yoshimura et al. |
| 6,282,317 | B1 | 8/2001 | Luo et al. |
| 6,304,298 | B1 | 10/2001 | Steinberg et al. |
| 6,389,417 | B1 | 5/2002 | Shin et al. |
| 6,778,699 | B1 | 8/2004 | Gallagher |
| 6,934,415 | B2 * | 8/2005 | Stentiford .................... 382/205 |
| 7,050,646 | B2 * | 5/2006 | Xu et al. ...................... 382/254 |
| 7,110,599 | B1 * | 9/2006 | Moriya et al. ............... 382/170 |
| 2001/0013895 | A1 | 8/2001 | Aizawa et al. |
| 2002/0081033 | A1 | 6/2002 | Stentiford |
| 2002/0126891 | A1 | 9/2002 | Osberger |
| 2005/0031178 | A1 | 2/2005 | Park |
| 2005/0074806 | A1 | 4/2005 | Skierczynski et al. |
| 2005/0169535 | A1 | 8/2005 | Stentiford |
| 2006/0050993 | A1 | 3/2006 | Stentiford |

FOREIGN PATENT DOCUMENTS

| | | |
|---|---|---|
| EP | 1126411 A1 | 8/2001 |
| EP | 1286539 A1 | 2/2003 |
| GB | 1417721 | 12/1975 |
| JP | 3-238533 | 10/1991 |
| JP | 2002-50066 | 2/2002 |
| WO | WO 82/01434 | 4/1982 |
| WO | WO 90/03012 | 3/1990 |
| WO | WO 99/05639 | 2/1999 |
| WO | WO 99/60517 | 11/1999 |
| WO | WO 00/33569 | 6/2000 |
| WO | WO 01/31638 A1 | 5/2001 |
| WO | WO 01/61648 A2 | 8/2001 |
| WO | WO 02/21446 A1 | 3/2002 |
| WO | WO 02/098137 A1 | 12/2002 |
| WO | WO 03/081523 A1 | 10/2003 |
| WO | WO 03/081577 A1 | 10/2003 |
| WO | WO 2004/042645 A1 | 5/2004 |
| WO | WO 2004/057493 A2 | 8/2004 |
| WO | WO 2005/057490 A2 | 6/2005 |
| WO | WO 2006/030173 A1 | 3/2006 |

OTHER PUBLICATIONS

International Search Report dated Mar. 18, 2002.

European Search Report dated Jan. 8, 2003 for RS 018248 GB.

European Search Report dated Jan. 9, 2003 for RS 108249 GB.

European Search Report dated Jan. 9, 2003 for RS 108251 GB.

European Search Report dated Jan. 8, 2003 for RS 108250 GB.

Lutton et al., "Contribution to the Determination of Vanishing Points Using Hough Transform", 1994 IEEE Transactions on Pattern Analysis and Machine Intelligence, vol. 16, No. 4, Apr. 1994, pp. 430-438.

McLean et al., "Vanishing Point Detection by Line Clustering", IEEE Transactions on Pattern Analysis and Machine Intelligence, vol. 17, No. 11, Nov. 1995, pp. 1090-1095.

Koizumi et al., "A New Optical Detector for a High-Speed AF Control", 1996 IEEE, pp. 1055-1061.

Itti et al., "Short Papers: A Model of Saliency-Based Visual Attention for Rapid Scene Analysis", IEEE Transactions on Pattern Analysis and Machine Intelligence, vol. 20, No. 11, Nov. 1998, pp. 1254-1259.

Shufelt, "Performance Evaluation and Analysis of Vanishing Point Detection Techniques", in Analysis and Machine Intelligence, vol. 21, No. 3, Mar. 1999, pp. 282-288.

Wixson, "Detecting Salient Motion by Accumulating Directionally-Consistent Flow", IEEE Transactions on Pattern Analysis and Machine Intelligence, vol. 22, No. 8, Aug. 2000, pp. 774-780.

Privitera et al., "Algorithms for Defining Visual Regions-of-Interest: Comparison with Eye Fixations", IEEE Transactions on Pattern Analysis and Machine Intelligence, vol. 22, No. 9, Sep. 2000, pp. 970-982.

Smeulders et al., "Content-Based Image Retrieval at the End of the Early Years", IEEE Transactions on Pattern Analysis and Machine Intelligence, vol. 22, No. 12, Dec. 2000, pp. 1349-1380.

Vailaya et al., "Image Classification for Content-Based Indexing", IEEE Transactions on Image Processing, vol. 10, No. 1, Jan. 2001, pp. 117-130.

Almansa et al., "Vanishing Point Detection Without Any A Priori Information", IEEE Transactions on Pattern Analysis and Machine Intelligence, vol. 25, No. 4, Apr. 2003, pp. 502-507.

Zhao et al., "Morphology on Detection of Calcifications in Mammograms", 1992 IEEE, pp. III-129-III-132.

Santini et al., "Similarity Matching", Proc $2^{nd}$ Asian Conf on Computer Vision, pp. II 544-548, IEEE, 1995.

Rui et al., "A Relevance Feedback Architecture for Content-Based Multimedia Information Retrieval Systems", 1997 IEEE, pp. 82-89.

Walker et al., "Locating Salient Facial Features Using Image Invariants", Proc. $3^{rd}$ IEEE International Conference on Automatic Face and Gesture Recognition, 1998, pp. 242-247.

Mahlmeister et al., "Sample-guided Progressive Image Coding", Proc. Fourteenth Int. Conference on Pattern Recognition, Aug. 16-20, 1998, pp. 1257-1259, vol. 2.

Osberger et al., "Automatic Identification of Perceptually Important Regions in an Image", Proc. Fourteenth Int. Conference on Pattern Recognition, Aug. 16-20, 1998, pp. 701-704, vol. 1.

Buhmann et al., "Dithered Colour Quantisation", Eurographics 98, Sep. 1998, http://opus.fu-bs.de/opus/volltexte/2004/593/pdf/TR-tubs-cq-1998-01.pdf.

Rui et al., "Relevance Feedback: A Power Tool for Interactive Content-Based Image Retrieval", IEEE Transactions on Circuits and Systems for Video Technology, vol. 8, No. 5, Sep. 1998, pp. 644-655.

Gallet et al., "A Model of the Visual Attention to Speed up Image Analysis", Proceedings of the 1998 IEEE International Conference on Image Processing (ICIP-98), Chicago, Illinois, Oct. 4-7, 1998, IEEE Computer Society, 1998, ISBAN-08186-8821-1, vol. 1, pp. 246-250.

Curtis et al., "Metadata—The Key to Content Management Services", $3^{rd}$ IEEE Metadata Conference, Apr. 6-7, 1999.

Stentiford, "Evolution: The Best Possible Search Algorithm?", BT Technology Journal, vol. 18, No. 1, Jan. 2000, (Movie Version).

Rother, "A New Approach for Vanishing Point Detection in Architectural Environments", $11^{th}$ British Machine Vision Conference, Bristol, UK, Sep. 2000, http://www.bmva.ac.uk/bmvc/2000/papers/p39.pdf.

Raeth et al., "Finding Events Automatically In Continuously Sampled Data Streams Via Anomaly Detection", Proceedings of the IEEE 2000 National Aerospace and Electronics Conference, NAECON, Oct. 10-12, 2000, pp. 580-587.

Sebastian et al., "Recognition of Shapes by Editing Shock Graphs", Proc. ICCV 2001, pp. 755-762.

Stentiford et al., "Automatic Identification of Regions of Interest with Application to the Quantification of DNA Damage in Cells", Human Vision and Electronic Imaging VII, B.E. Rogowitz, T.N. Pappas, Editors, Proc. SPIE vol. 4662, pp. 244-253, San Jose, Jan. 20-26, 2002.

Xu et al., "Video Summarization and Semantics Editing Tools", Storage and Retrieval for Media Databases, Proc. SPIE, vol. 4315, San Jose, Jan. 21-26, 2001.

Stentiford, "An Estimator for Visual Attention Through Competitive Novelty with Application to Image Compression", Picture Coding Symposium 2001, Apr. 25-27, 2001, Seoul, Korea, pp. 101-104, http://www.ee.ucl.ac.uk/-fstentif/PCS2001-pdf.

Stentiford, "An Evolutionary Programming Approach to the Simulation of Visual Attention", Congress on Evolutionary Computation, Seoul, May 27-30, 2001, pp. 851-858.

Cantoni et al., "Vanishing Point Detection: Representation Analysis and New Approaches", 11th Int. Conf. on Image Analysis and Processing, Palermo, Italy, Sep. 26-28, 2001.

Ouerhani et al., "Adaptive Color Image Compression Based on Visual Attention", Proc. 11th Int. Conference on Image Analysis and Processing, Sep. 26-28, 2001, pp. 416-421.

Russ et al., "Smart Realisation: Delivering Content Smartly", J. Inst. BT Engineers, vol. 2, Part 4, pp. 12-17, Oct.-Dec. 2001.

Bradley et al., "JPEG 2000 and Region of Interest Coding", Digital Imaging Computing—Techniques and Applications, Melbourne, Australia, Jan. 21-22, 2002.

Roach et al., "Recent Trends in Video Analysis: A Taxonomy of Video Classification Problems", 6th IASTED Int. Conf. on Internet and Multimedia Systems and Applications, Hawaii, Aug. 12-14, 2002, pp. 348-353.

Bradley et al., "Visual Attention for Region of Interest Coding in JPEG 2000", Journal of Visual Communication and Image Representation, vol. 14, pp. 232-250, 2003.

Stentiford, "An Attention Based Similarity Measure with Application to Content-Based Information Retrieval", Storage and Retrieval for Media Databases 2003, M.M. Yeung, R.W. Lienhart, C-S Li, Editors, Proc SPIE vol. 5021, Jan. 20-24, Santa Clara, 2003.

Stentiford, "The Measurement of the Salience of Targets and Distractors through Competitive Novelty", 26th European Conference on Visual Perception, Paris, Sep. 1-5, 2003, (Poster).

Stentiford, "An Attention Based Similarity Measure for Fingerprint Retrieval", Proc. 41st European Workshop on Image Analysis for Multimedia Interactive Services, pp. 27-30, London, Apr. 9-11, 2003.

Okabe et al., Object Recognition Based on Photometric Alignment Using RANSAC, Proceedings of the 2003 IEEE Computer Society Conference on Computer Vision and Pattern Recognition (CVPR'03), vol. 2, pp. 221-228, Jun. 19-20, 2003.

Oyekoya et al., "Exploring Human Eye Behaviour Using a Model of Visual Attention", International Conference on Pattern Recognition 2004, Cambridge, Aug. 23-26, 2004, pp. 945-948.

Stentiford, "A Visual Attention Estimator Applied to Image Subject Enhancement and Colour and Grey Level Compression", International Conference on Pattern Recognition 2004, Cambridge, Aug. 23-26, 2004, pp. 638-641.

Rasmussen, "Texture-Based Vanishing Point Voting for Road Shape Estimation", British Machine Vision Conference, Kingston, UK, Sep. 2004, http://www.bmva.ac.uk/bmvc/2004/papers/paper_261.pdf.

Finlayson et al., "Illuminant and Device Invariant Colour Using Histogram Equalisation", Pattern Recognition, vol. 38, No. 2 (Feb. 2005), pp. 179-190.

Stentiford, "Attention Based Facial Symmetry Detection", International Conference on Advances in Pattern Recognition, Bath, UK, Aug. 22-25, 2005.

Stentiford, "Attention Based Symmetry Detection in Colour Images", IEEE International Workshop on Multimedia Signal Processing, Shanghai, China, Oct. 30-Nov. 2, 2005.

Wang et al., "Efficient Method for Multiscale Small Target Detection from a Natural Scene", 1996 Society of Photo-Optical Instrumentation Engineers, Mar. 1996, pp. 761-768.

Rohwer et al., "The Theoretical and Experimental Status of the n-Tuple Classifier", Neural Networks, vol. 11, No. 1, pp. 1-14, 1998.

Brown, A Survey of Image Registration Techniques, ACM Computing Surveys, vol. 24, No. 4, Dec. 1992, pp. 325-376.

Zhao et al., "Face Recognition: A Literature Survey", CVLK Technical Report, University of Maryland, Oct. 2000, ftp://ftp.cfar.umd.edu/TRs/CVL-Reports-2000/TR4167-zhao.ps.qz.

Stentiford et al., "An Evolutionary Approach to the Concept of Randomness", The Computer Journal, pp. 148-151, Mar. 1972.

International Search Report mailed Feb. 9, 2006 in International Application No. PCT/GB2005/003339.

Chang et al., "Fast Algorithm for Point Pattern Matching: Invariant to Translations, Rotations and Scale Changes", Pattern Recognition, vol. 30, No. 2, Feb. 1997, pp. 311-320.

* cited by examiner

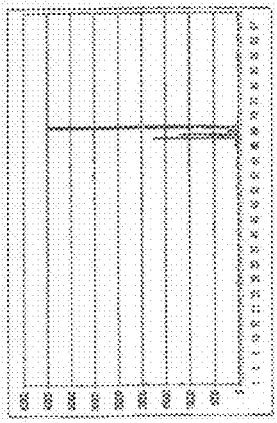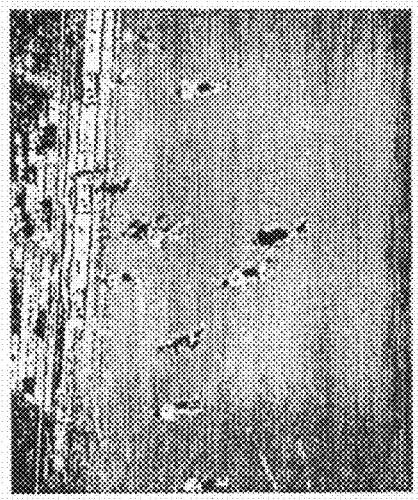
JPEG – 10853 bytes
Fig. 5c
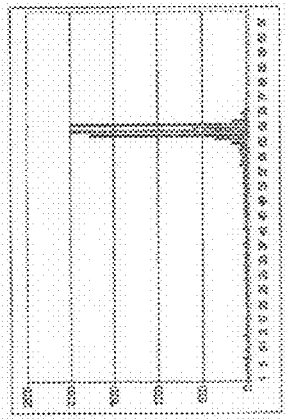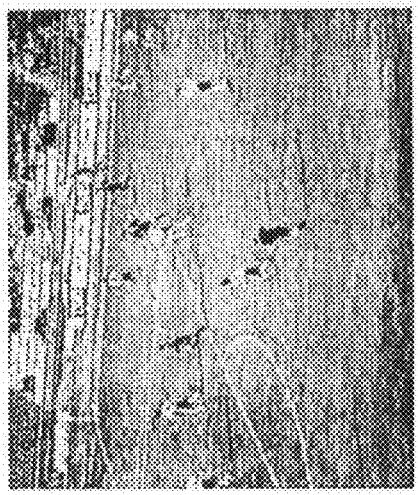
JPEG – 13719 bytes
Fig. 5b
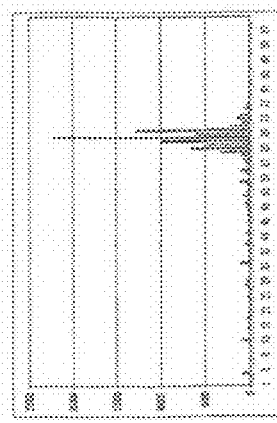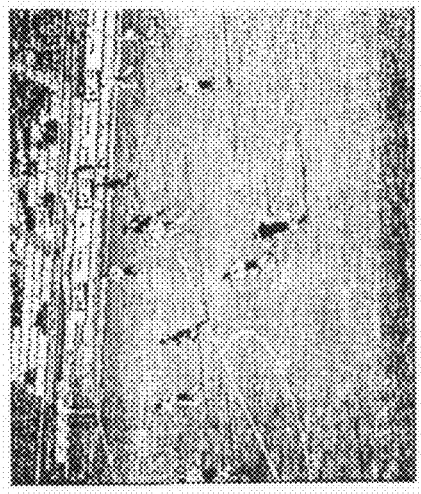
Gif – 75037 bytes
Fig. 5a
Figure 5

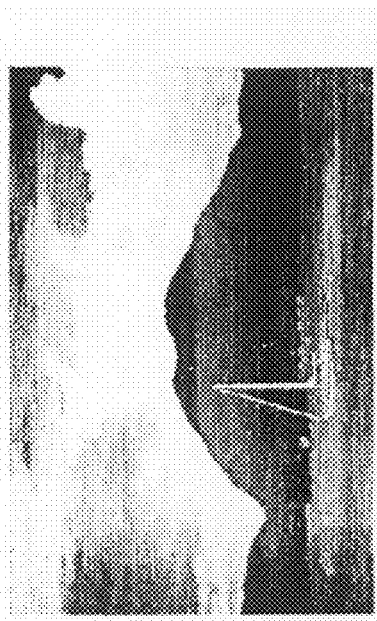
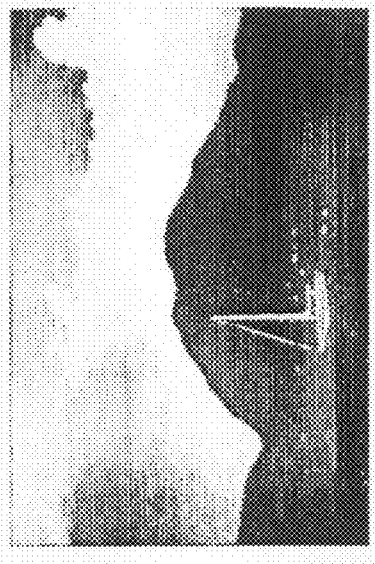
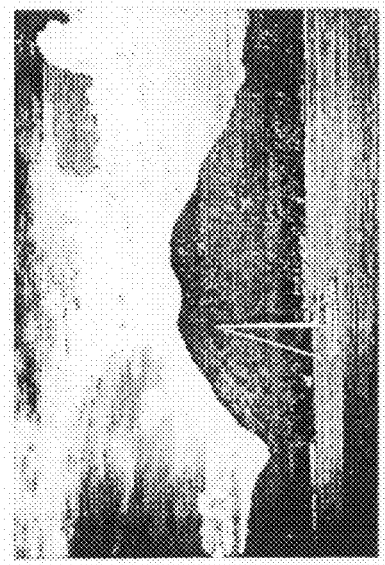
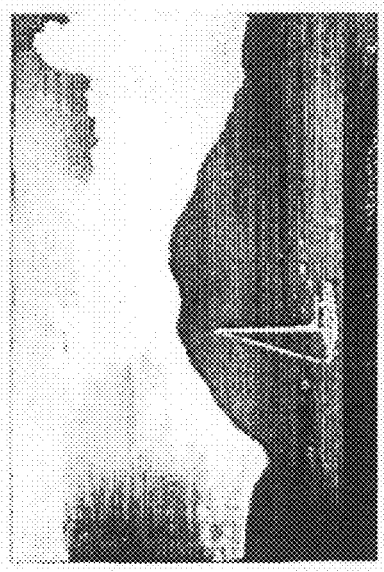
Figure 6

Fig. 8a Original
Fig. 8b Processed image

IMAGE FILTERING BASED ON COMPARISON OF PIXEL GROUPS

This application is the U.S. national phase of international application PCT/GB2004/005049 filed 1 Dec. 2004 which designated the U.S. and claims benefit of GB 0328326.4, dated 5 Dec. 2003, the entire content of which is hereby incorporated by reference.

BACKGROUND

1. Technical Field

The present invention is concerned with image processing.

2. Related Art

There is extensive prior art in the filed of image processing. One example is Brett, U.S. Pat. No. 5,850,471, directed to high-definition digital video processing, wherein a given pixel value is compared to its neighbors and, under certain conditions, is replaced by an average value. In effect, this is a smoothing filter that may be used to remove noise. Other prior art is discussed below.

BRIEF SUMMARY

According to the present exemplary embodiments, there is provided a method of processing a digitally coded image in which picture elements are each represented by a color value, comprising, for each of a plurality of said picture elements:

(a) performing a plurality of comparisons, each comparison comprising comparing a first picture element group which comprises the picture element under consideration and at least one further picture element in the vicinity thereof with a second picture element group which comprises a base picture element and at least one further picture element, the number of picture elements in the second group being the same as the number of picture elements in the first group and the position of the or each further element of the second group relative to the base picture element of the second group being the same as the position of the or a respective further element of the first group relative to the picture element under consideration, wherein each comparison determines whether the two groups match in the sense that they meet a criterion of similarity; and (b) when at least one comparison results in a match, computing a replacement color value for the picture element under consideration, the replacement color value being a function of the color value for the base picture element of the or each second group for which a match was obtained.

Preferably, the method includes identifying picture elements which meet a criterion of distinctiveness, and computing a replacement color value only for picture elements not meeting the distinctiveness criterion.

Other, preferred, aspects of the exemplary embodiments are defined in the appended claims.

BRIEF DESCRIPTION OF THE DRAWINGS

Some embodiments of the invention will now be described, by way of example, with reference to the accompanying drawings, in which:

FIGS. 5 to 8 illustrate the effects of this processing on some sample images.

DETAILED DESCRIPTION OF EXEMPLARY EMBODIMENTS

Figure 1:
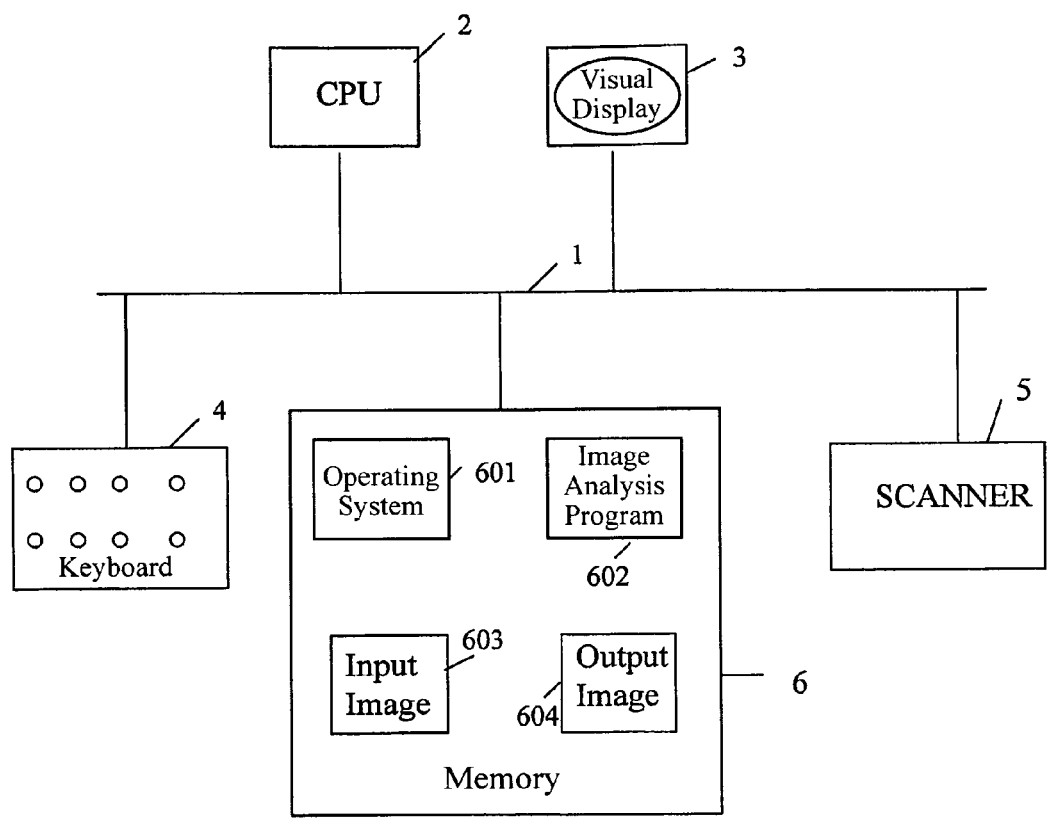
FIG. 1 is a block diagram of an apparatus for performing the invention.

FIG. 1 shows an apparatus consisting of a general purpose computer programmed to perform image analysis according to a first embodiment of the invention. It has a bus 1, to which are connected a central processing unit 2, a visual display 3, a keyboard 4, a scanner 5 (or other input device, not shown) for input of images, and a memory 6.

In the memory 6 are stored an operating system 601, a program 602 for performing the image analysis, and storage areas 603, 604 for storing an image to be processed and a processed image, respectively. Each image is stored as a two-dimensional array of values, each value representing the brightness and/or color of a picture element within the array.

Figure 2:
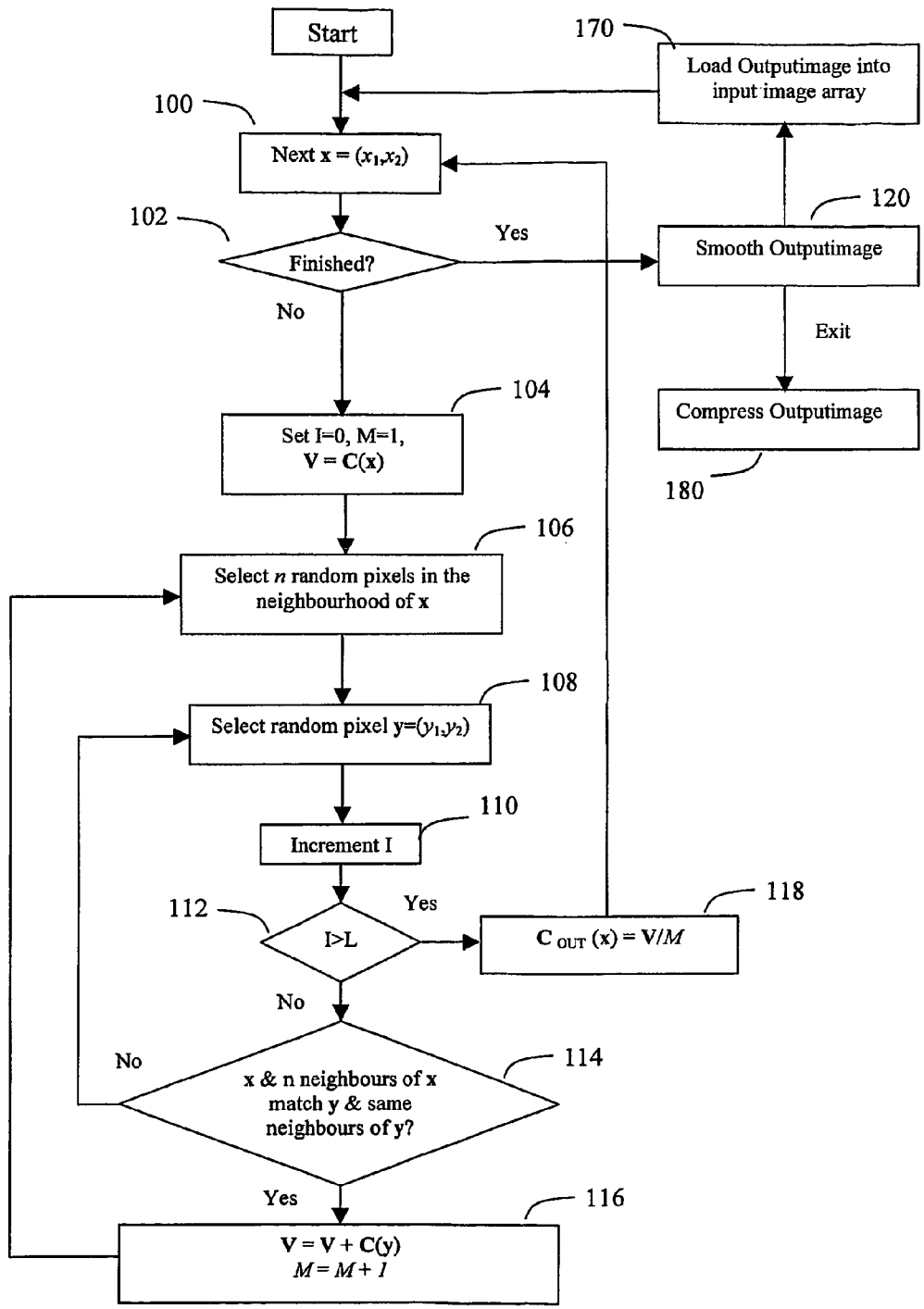
FIG. 2 is a flowchart of the steps to be performed by the apparatus of FIG. 1 in accordance with one embodiment of the invention.

In a first embodiment of the invention, the program 602 is arranged to operate as shown in the flowchart of FIG. 2. The image to be processed is stored as an array [C] of pixels where the position of a pixel is expressed in Cartesian co-ordinates, e.g. $(x_1, x_2)$ or as a vector (in bold type), e.g. $\mathbf{x}=(x_1, x_2)$. The color of a pixel at $\mathbf{x}$ is stored as a vector $C(\mathbf{x})$ consisting of three components. In these examples r, g, b components are used, but other color spaces could be employed. In a monochrome system, C would have only one (luminance) component. The results of this process are to be stored in a similar array $C_{OUT}$.

The process is iterative and starts at Step 100 which simply indicates that one begins with one pixel x and repeats for each other pixel (the order which this is performed is not significant), exiting the loop at Step 102 when all have been processed. However it is not essential to process all pixels: some may be deliberately excluded, for reasons that will be discussed presently.

In Step 104, a comparison count I is set to zero, a match count M is set to 1, and a color vector V is set to the color at x. V has three components which take values according to the color space employed, e.g. (r, g, b).

Step 106: n (typically 3) random pixels at $x'_i=(x'_{i1}x'_{i2})$ $i=1,\ldots n$ are selected in the neighborhood of x where $|x'_{ij}-x_j|<r_j$ for all $j=1, 2$ and $r_j$ defines the size of a rectangular neighborhood (or square neighborhood with $r_1=r_2=r$). A typical value for $r_j$ would be 2 for a 640×416 image.

Step 108: A pixel at $\mathbf{y}=(y_1, y_2)$ is then randomly selected elsewhere in the image and (Step 110) the comparison count I incremented. This pixel is selected to be $>r_j$ from the image boundary to avoid edge effects. If desired, the choice of y could be limited to lie within a certain maximum distance from x. If, at Step 112, the value of I does not exceed the value of a threshold L (typical values are 10-100), a test for a match between the neighborhoods of x and y is carried out.

Step 114: Let the color of the pixel at x be $C(\mathbf{x})=(C_1(\mathbf{x}), C_2(\mathbf{x}), C_3(\mathbf{x}))=(r_x, g_x, b_x)$ Then the neighborhoods match if each of the pixels x, $x'_i$ (that is, the pixel under consideration and its n neighboring pixels) matches the corresponding pixel at y, $Y'_i$, where the positions of $y'_i$ relative to y are the same as those of $x'_i$ relative to x. That is to say:

$x-x'_i=y-y'_i$ for all $i=1,\ldots,n$.

where pixels at x and y are deemed to match if $|C_j(x)-C_j(y)|<d_j$ for all $j=1, 2, 3$.

and similarly for $x'_i$ and $y'_i$:

$$|C_j(x'_i) - C_j(y'_i)| < d_j \text{ for all } j=1,2,3 \text{ and all } i=1, \ldots, n.$$

where $d_j$ is a threshold that determines whether color component j is sufficiently different to constitute a pixel mismatch. In the tests described below, the color components were represented on a scale of 0 to 255 and a single value of $d_j=80$ was used. In general, $d_j$ may be dependent upon x. For example, it may be preferred to model attention so that less emphasis is given to darker regions by increasing $d_j$ in these areas.

If a match is found, then at Step 116 the counter M is incremented and the values of the color components at y are added to V.

$$V = V + C(y)$$

Following a match, the process returns to Step 106 of selecting a fresh neighborhood around x containing n random pixels, whereas if no match is found, it returns to Step 108 to select a new y without changing the pixel neighborhood.

If at Step 112, the value of I exceeds the threshold L, the color of the pixel at $x=(x_1, x_2)$ in the transformed image is given (Step 118) the average value of the colors of the M pixels found to have matching neighborhoods i.e.

$$C_{OUT}(x) = V/M.$$

This process is repeated from Step 100 until all pixels in the image have been dealt with. The resulting transformed image possesses a much reduced spread of colors, but also contains small levels of noise arising from the random nature of the algorithm. This noise can be simply removed (Step 120) by applying a standard smoothing algorithm. In this embodiment, a pixel is assigned the average color of the pixels in the surrounding 3×3 window.

Figure 3:
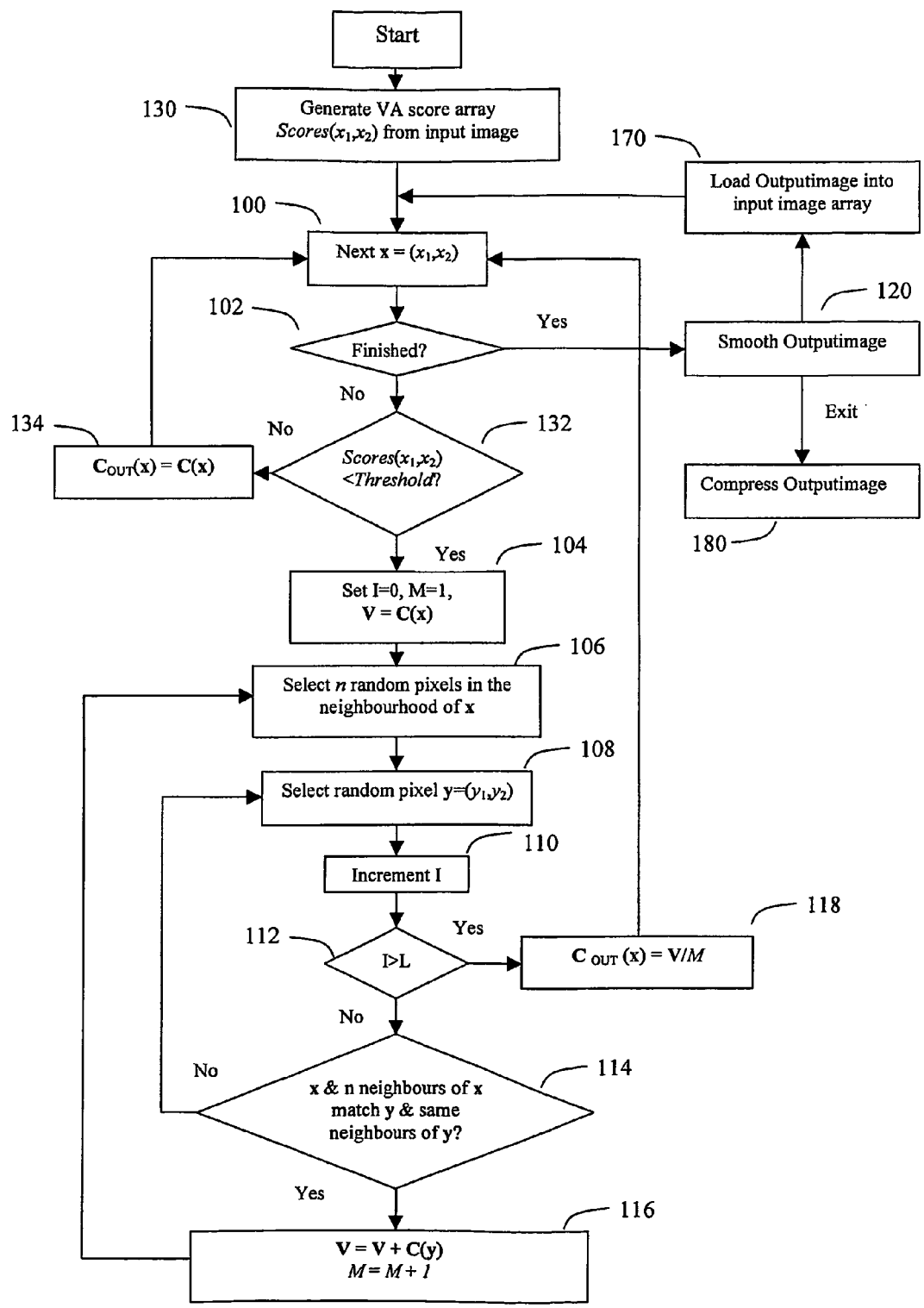
FIG. 3 is a similar flowchart for a second embodiment of the invention.

The algorithm shown in FIG. 2 processes all pixels x, and all will have their colors altered except in the case of pixels whose neighborhoods are so dissimilar to the rest of the image that no matches are found. In that the process necessarily involves a loss of information, we prefer to identify important parts of the image and exclude these. Thus, the embodiment of FIG. 3 excludes regions of interest from the filtering process. In FIG. 3, those steps which are identical to those of FIG. 2 are given the same reference numerals.

The process begins at Step 130 with the generation of a saliency map consisting of an array of attention scores Scores $(x_1, x_2)$ using the method described in our international patent application WO01/61648 (also published as US 20020080133). Other methods of generating saliency maps may also be used although their performance may not always be best suited to this application: See for example L Itti, C Koch and E Niebur, "A model of saliency-based visual attention for rapid scene analysis," IEEE Trans on PAMI, vol 20, no 11, pp 1254-1259, November 1998; W Osberger and A J Maeder, "Automatic identification of perceptually important regions in an image," Proc 14$^{th}$ IEEE Int. Conf on Pattern Recognition, pp 701-704, August 1998; and W Osberger, U.S. Patent Application no 2002/0126891, "Visual Attention Model," Sep. 12, 2002. The values of Scores$(x_1, x_2)$ assigned to each pixel at $x=(x_1, x_2)$ or a subset of pixels in an image reflect the level of attention at that location.

A value is given to the variable T. typically 0.9, which sets a threshold on Scores$(x_1, x_2)$ and determines whether the color of the pixel at x is to be transformed or not where $$\text{Threshold} = T^*(\max - \min) + \min \text{ and } \max =$$

$$\max_{x_1 x_2}(\text{Scores}(x_1, x_2)) \min = \min_{x_1 x_2}(\text{Scores}(x_1, x_2)).$$

However, other means of calculating the value of Threshold may be used some of which can be dependent upon x.

If at Step 132 the value of Scores$(x_1, x_2)$ is greater than Threshold, the pixel in the original image at x is, at Step 134, copied unchanged into the transformed image array $C_{OUT}(x_1, x_2)$. This pixel represents a point of high attention in the image and will not be altered by this process.

The remainder of the process is as previously described: note however that, owing to the test at 132, in the smoothing algorithm, the color value is replaced by the smoothed value only for those pixels whose attention scores are less than the value of Threshold.

Figure 4:
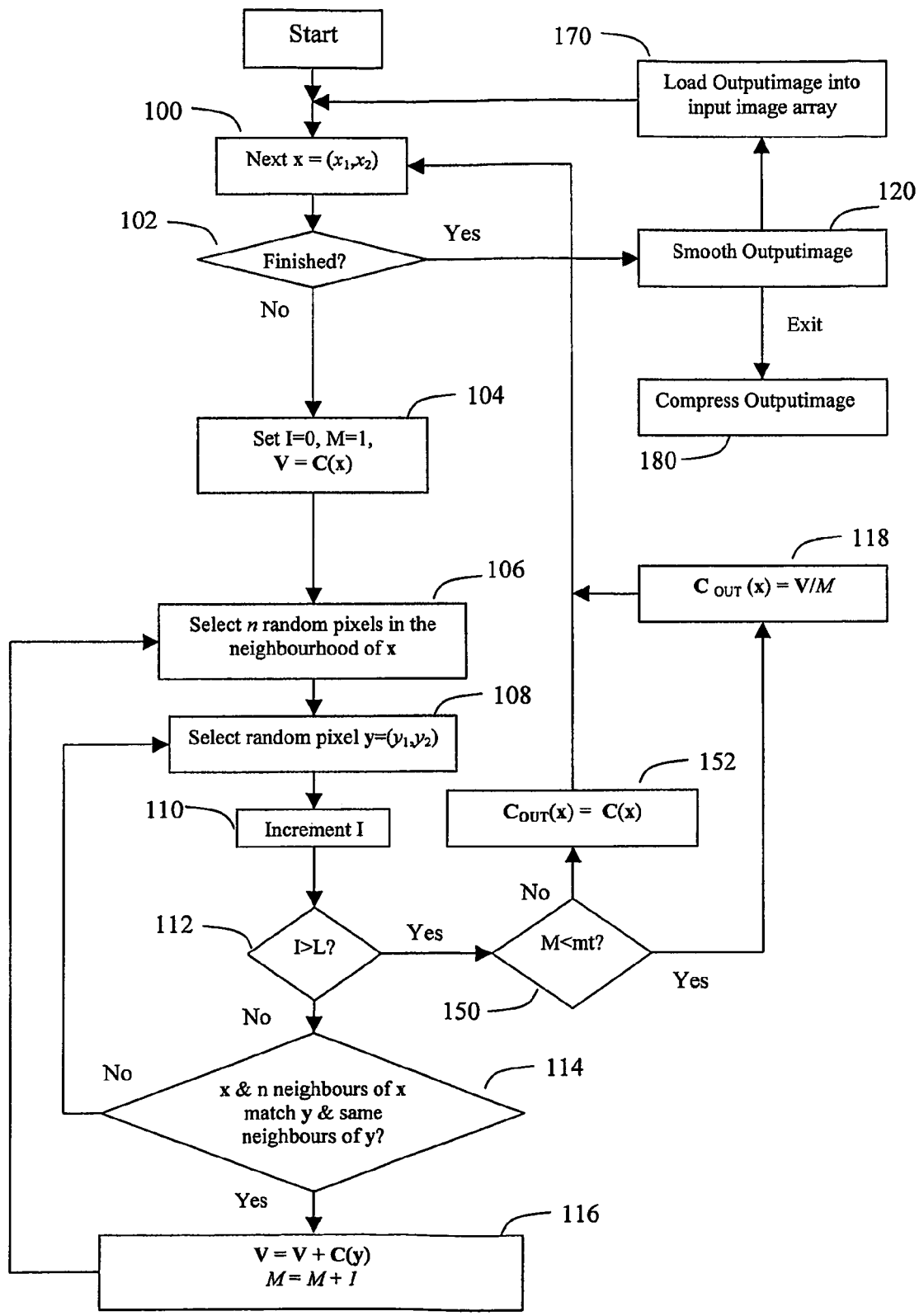
FIG. 4 is a similar flowchart for a third embodiment of the invention.

Another embodiment is shown in FIG. 4 in which attention scores are not computed beforehand. Instead, when at Step 112 the comparison count I exceeds the threshold L, a test is performed at Step 150 to determine whether the match count M is greater than a threshold mt. If so, then, as before, the color of the pixel at $(x_1, x_2)$ in the transformed image is given, at Step 118, the average value of the colors of the M pixels found to have matching neighborhoods i.e. V/M If, however, M is less than or equal to mt, the pixel in the original image at x is, at Step 152, copied unchanged into the transformed image array $C_{OUT}(x_1, x_2)$. This means that pixels representing areas of high attention will be unlikely to be altered because only low values of M will be obtained in these image regions.

The degree of filtering that is applied to the image may be controlled by selecting the value of the thresholds $d_j$. Alternatively, or in addition, the filtering process can if desired be repeated: as shown at Step 170 in all three versions. The transformed image may be reloaded while (in the case of FIG. 4) retaining the original attention scores Scores$(x_1, x_2)$ and the whole process repeated to obtain successive transformations and greater suppression of background information.

Note that where random selection is called for, pseudo-random selection may be used instead.

Once filtering is complete, the transformed image may if desired be encoded in JPEG format (or any other compression algorithm) as shown at Step 180. The reduction in information contained in regions of low interest enables higher compression performances to be attained than on the original image.

The results of applying the algorithm of FIG. 4 to a football source are shown in FIGS. 5*a-c*, which show, from left to right, FIG. 5*a* the original image (GIF format), FIG. 5*b* the image after JPEG coding, and FIG. 5*c* the image after filtering followed by JPEG CODING. Histograms of the distribution of hue values in the range 1-100 are also shown. It is found that the filtering reduces the compressed image file size from 13719 bytes to 10853 bytes.

Typically two iterations of pixel color replacement and smoothing are sufficient, but this can be extended depending upon the color reduction required.

FIGS. 6*a-d* illustrate how background information may be substantially removed while preserving important features of the image such as the boat and the mountain outline. The original JPEG encoding (FIG. 6*a*) occupies 13361 bytes which is reduced to 10158 bytes after processing once and JPEG encoding the transformed version (FIG. 6*b*). The output image is reprocessed using the same VA scores and obtains a file size of 8881 bytes (FIG. 6*c*). A further iteration obtains a size of 8317 bytes (FIG. 6*d*).

Figure 7:
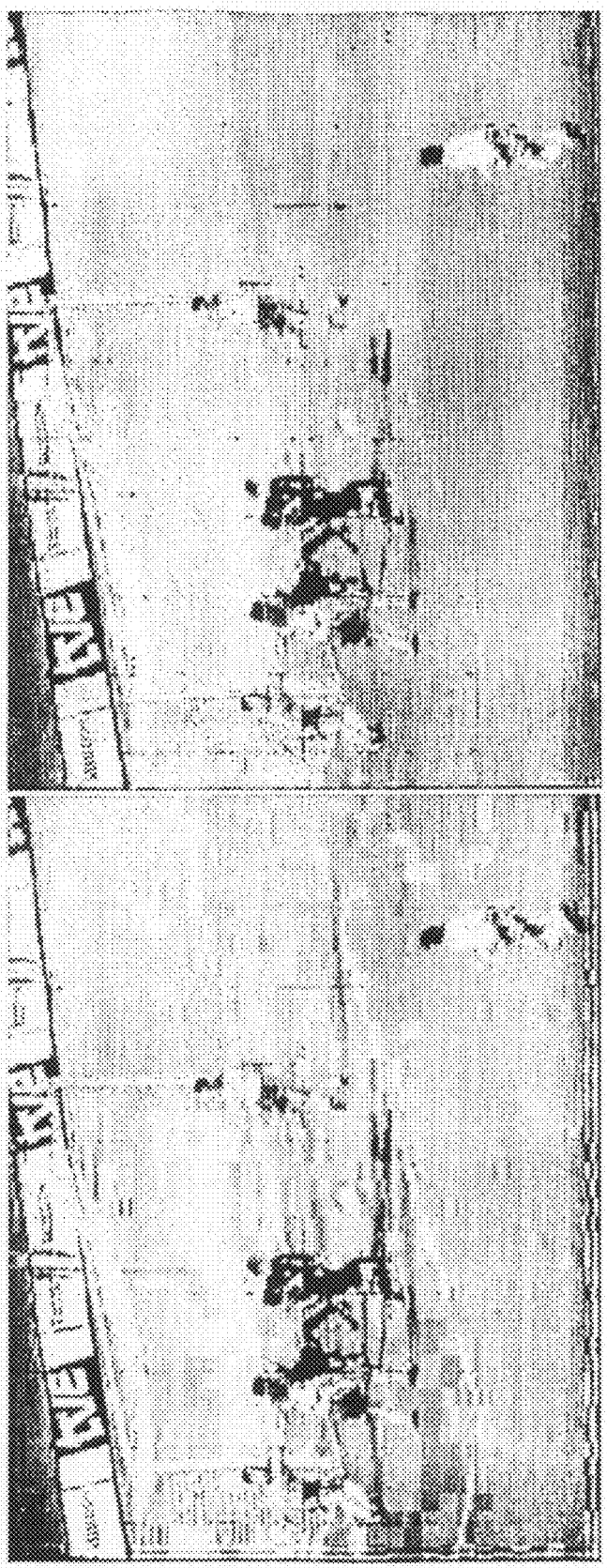

This method may be applied with advantage to images containing artifacts (such as JPEG blocking effects). The re-assignment of colors to background regions tends to remove artifacts which normally possess some similarity to their surroundings (see FIGS. 7*a-b*, where the original image is shown on the left; on the right in FIG. 7b is shown the image obtained following processing with this method and subsequent re-coding using JPEG). However, artifacts which are very obtrusive and interfere with the main subject material will not be removed.

Figure 8:
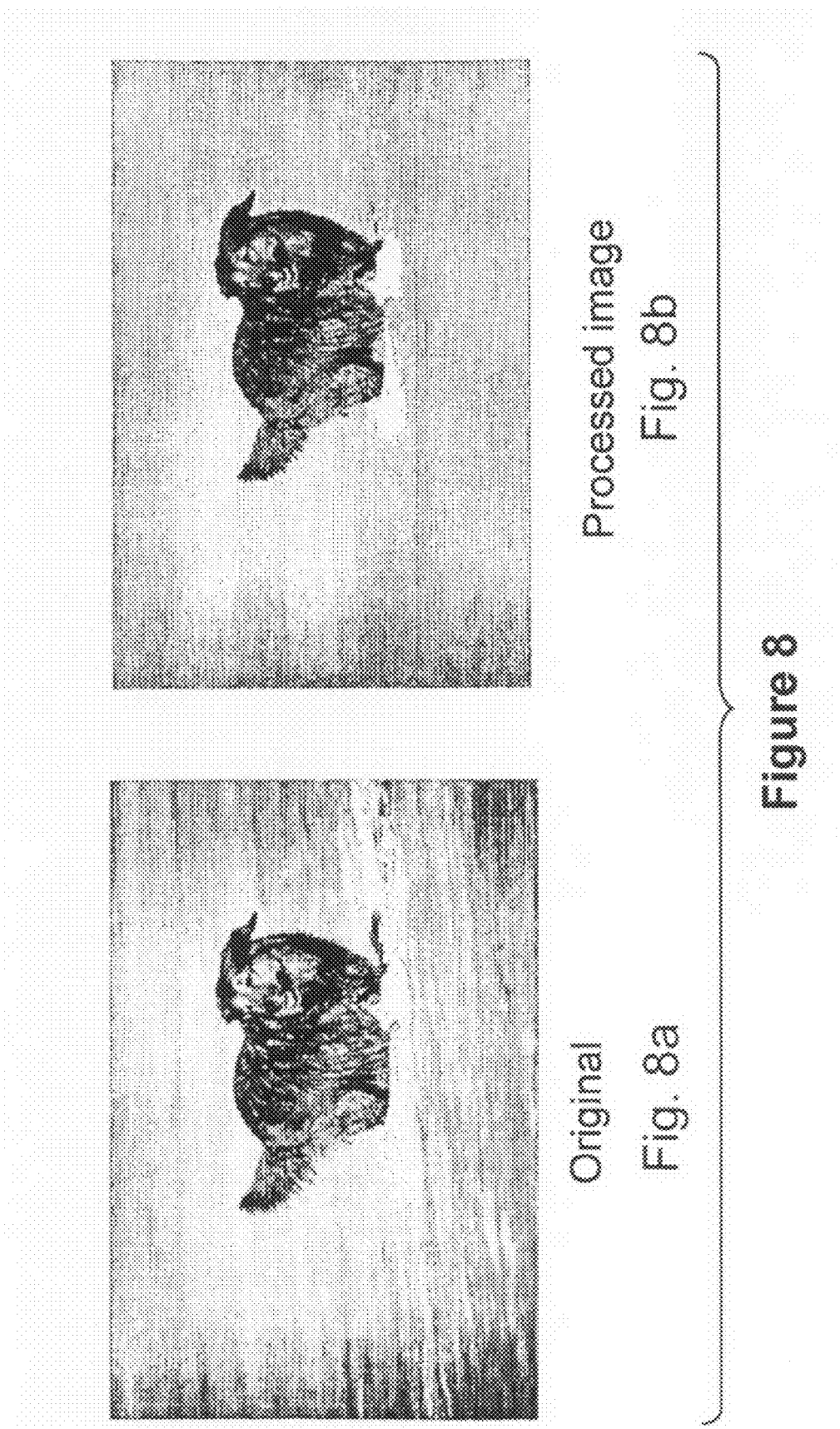

A further application of the method is the enhancement of figure-ground or the removal of background distractions for improved recognizability. This application is illustrated in FIGS. 8a-b in which the background is almost completely replaced with a constant color and the image of the dog is much more prominent. The method could therefore be applied to the processing of images displayed in a digital viewfinder in a camera where the enhancement of subject material will assist photographers to compose their pictures.

Essential visual information is retained in the transformed images while reducing the variability of colors in unimportant areas. The transformed images thereby become much easier to segment using conventional algorithms because there are fewer color boundaries to negotiate and shape outlines are more distinct. This means that this method will enhance the performance of many conventional algorithms that seek to partition images into separate and meaningful homogeneous regions for whatever purpose.

In the embodiments we have described, the replacement color value used is the average of the original value and those of all the pixels which it was found to match (although in fact it is not essential that the original value be included). Although in practice this does not necessarily result in a reduction in the number of different color values in the image, nevertheless it results in a reduction in the color variability and hence—as has been demonstrated—increases the scope for compression and/or reduces the perception of artifacts in the image. Other replacement strategies may be adopted instead. For example, having obtained the average, the replacement could be chosen to be that one of a more limited (i.e. more coarsely quantized) range of colors to which the average is closest. Or the match results could be used to identify groups of pixels which could then all be assigned the same color value.

These embodiments assume that low level segmentation algorithms should not be applied to those areas in an image that merit high visual attention. Such regions are naturally anomalous and contain a high density of meaningful information for an observer. This means that any attempt to segment these areas is likely to be arbitrary because there is little or no information in the surrounding regions or elsewhere in the image that can be usefully extrapolated. On the other hand less significant parts of the image that are more extensive can justifiably be transformed using quite primitive and low level algorithms. Paradoxically, distinctive object edges in an image attract high attention and therefore are not subjected to alteration in this approach. In fact the edges of objects at the pixel level in real images are extremely complex and diverse and would need specifically tailored algorithms to be sure of a correct result in each case.

The second and third embodiments of the invention offer an approach to color compression that makes use of a visual attention algorithm to determine visually important areas in the image which are not to be transformed. This approach therefore possesses the significant advantage that the process of assigning region identities does not have to address the difficult problem of defining edges which normally hold the highest density of meaningful information. Non-attentive regions are transformed according to parameters derived from the same VA algorithm which indicates those regions sharing properties with many other parts of the image. The visual attention algorithm does not rely upon the pre-selection of features and hence has application to a greater range of images than standard feature based methods which tend to be tailored to work on categories of images most suited to the selected feature measurements. Pixels in the regions subject to transformation are assigned an average color and increased compression obtained through JPEG encoding or any other compression standard. Compression is applied to the least attentive regions of the image and, therefore, is unlikely to affect the perceptual quality of the overall image. The algorithm may be iteratively applied to the transformed images to obtain further compression at the expense of more background detail.

What is claimed is:

1. An automated computer-implemented method of processing a digitally coded image in which picture elements are each represented by a color value, said method comprising, for each of a plurality of said picture elements, using a programmed computer having a CPU, memory and I/O ports configured to:

(a) perform a plurality of comparisons, each comparison comprising comparing a first picture element group of plural pixels, which first group comprises the picture element under consideration and at least one further picture element in the vicinity thereof with a second picture element group of plural pixels, which second group comprises a base picture element and at least one further picture element, the number of picture elements in the second group being the same as the number of picture elements in the first group and the position of each further element of the second group relative to the base picture element of the second group being the same as the position of the respective further element of the first group relative to the picture element under consideration, wherein each comparison determines whether the two groups match in the sense that they meet a criterion of similarity; and (b) when at least one comparison results in a match, computing a replacement color value for the picture element under consideration, the replacement color value being a function of the color value for the base picture element of each second group for which a match was obtained.

2. A method according to claim 1 wherein said programmed computer is used to identify picture elements which meet a criterion of distinctiveness, and computing a replacement color value only for picture elements not meeting the distinctiveness criterion.

3. A method according to claim 2 wherein said programmed computer identifies picture elements which meet a criterion of distinctiveness in advance of step (a), and said comparisons are performed in step (a) only for picture elements not meeting the distinctiveness criterion.

4. A method according to claim 2 wherein said programmed computer uses as the criterion of distinctiveness for a picture element the number of matches obtained for that picture element which exceed a threshold.

5. A method according to claim 1 wherein the selection of each further picture element of the first group is selected in a random or pseudo-random manner.

6. A method according to claim 1 wherein the selection of each further picture element of the first group is selected in a random or pseudo-random manner from picture elements lying within a predetermined distance of the element under consideration.

7. A method according to claim 1 wherein the further elements are selected afresh following a match.

8. A method according to claim 1 wherein the selection of the base picture element of the second group is selected in a random or pseudo-random manner.

9. A method according to claim 1 wherein the selection of the base picture element of the second group is selected in a random or pseudo-random manner from picture elements lying within a predetermined distance of the element under consideration.

10. A method according to claim 1 wherein the base picture element for the second group is selected afresh for each comparison.

11. A method according to claim 1 wherein the image is a monochrome image and the color value is a single, luminance component.

12. A method according to claim 1 wherein the image is a color image and the color value has three components.

13. A method according to claim 11 wherein the match criterion is that no component of any picture element of the first group differs from the corresponding component of the spatially corresponding element of the second group by more than a threshold amount.

14. A method according to claim 1 wherein the replacement color value for a pixel is a function also of its existing color value.

15. A method according to claim 14 wherein the replacement color value is the average of the color value for the picture element under consideration and the color value for the base picture element of the or each second group for which a match was obtained.

16. A method according to claim 14 wherein the replacement color value is that one of a predetermined set of color values which is closest to the average of the color value for the picture element under consideration and the color value for the base picture element of the or each second group for a match was obtained.

17. A method according to claim 1 including the step of processing the processed image again.

18. A method according to claim 1 including the step of applying spatial filtering to the processed image.

19. A method according to claim 1 including the step of encoding the processed image using a compression algorithm.

20. An image processing apparatus comprising:
memory means for storing an image; and
computer means including a programmed computer connected for access to said memory means and memory storing a program configured when executed to perform the method of claim 1.

21. A computer-readable storage medium containing at least one computer program comprising a set of instructions which, when executed by a computer system, effect the method of claim 1.

* * * * *